April 1, 1952     C. T. SAMPSON     2,591,013
FISHHOOK
Filed Nov. 12, 1948
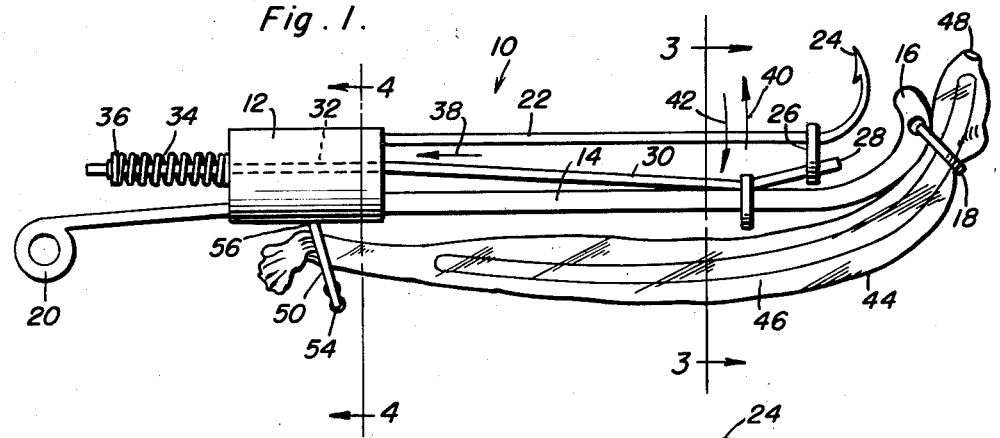
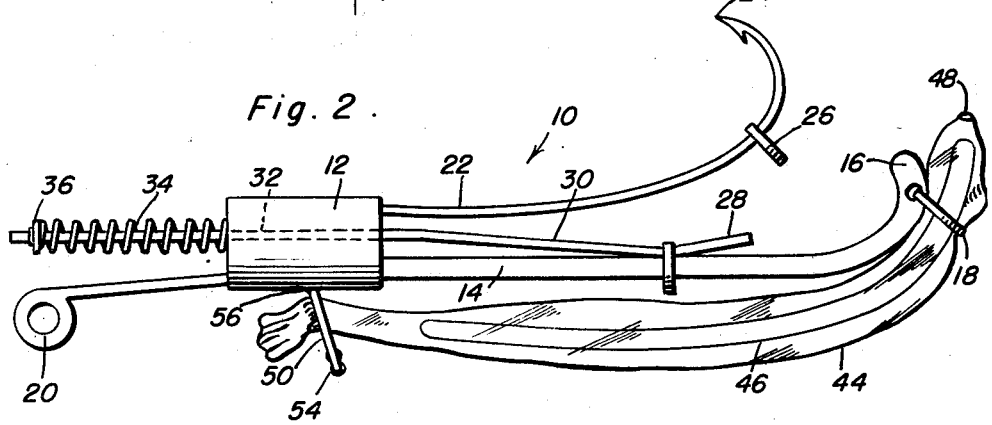
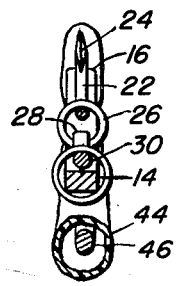
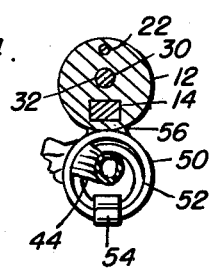
Inventor
Charles T. Sampson
By *Clarence A. O'Brien and Harvey B. Jacobson*
Attorneys Patented Apr. 1, 1952

2,591,013

UNITED STATES PATENT OFFICE 2,591,013

FISHHOOK

Charles T. Sampson, Wilberforce, Ohio

Application November 12, 1948, Serial No. 59,563

1 Claim. (Cl. 43—41)

This invention relates to new and useful improvements and structural refinements in fish hooks, and the principal object of the invention is to provide a fish hook of the character herein described wherein a resilient hook member is projectable laterally from its normal position adjacent a bait carrying shank, the hook member being controlled by trigger means which, in turn, is responsive to actuation of the hook member when a fish attempts to swallow the bait, in which instance the hook member is automatically released by the trigger means and is projected laterally to a position in which it may best engage the mouth of the fish.

An important feature of the invention, therefore, resides in the particular arrangement of the resilient hook member and trigger means, and another feature of the invention lies in the provision of a transparent bait receptacle which preserves the bait and displays it to good advantage so that it may properly attract the attention of fish.

A still further feature of the invention resides in the provision of means for releasably attaching the bait receptacle to its shank, whereby convenient and expeditious installation and changing of the bait is facilitated.

Some of the advantages of the invention lie in its simplicity of construction, in its convenience and efficient use, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention in its "set" position;

Figure 2 is a side elevational view, similar to that shown in Figure 1, but illustrating the invention in its "projected" position;

Figure 3 is a cross sectional view, taken substantially in the plane of the line 3—3 in Figure 1, and Figure 4 is a cross sectional view, taken substantially in the plane of the line 4—4 in Figure 1.

Like characters of reference are employed to designate like parts in the specification and throughout the several views.

Referring now to the accompanying drawings in detail, the invention consists of a fish hook designated generally by the reference character 10, the same embodying in its construction a preferably cylindrical supporting block 12 to which is secured what may be called a bait carrying shank 14, one end portion of the latter being arcuated as at 16 and being provided with either a rigidly mounted or a swingably mounted loop 18, the purpose of which will be hereinafter described.

As will be clearly apparent from the accompanying drawings, the shank 14 is rigidly secured in the block 12 and the remaining end portion of the shank projects from the block and terminates in an eye 20, whereby the entire fish hook may be attached to the fishing line (not shown).

A hook member 22, formed from resilient wire, has one end portion thereof rigidly secured to the block 12, while the bill portion of the hook member is provided with the usual pointed extremity 24. It is to be noted that an eye 26 is secured to the bill portion of the hook member 22, this eye being separably engageable with an angulated end portion 28 of a resilient, bendable trigger rod 30.

The rod 30 is slidable in a bore 32 formed in the block 12 and projects outwardly therefrom in order to carry a compression spring 34 which is interposed between the block 12 and a stop washer 36 with which the rod 30 is provided, substantially as shown. It is to be noted that by virtue of this arrangement, the spring 34 normally urges the rod 30 in the direction of the arrow 38 in Figure 1.

The hook member 22 is normally disposed adjacent the shank 14, this being effected by inserting the end portion 28 of the rod 30 in the eye 26, so that while the spring 34 tends to draw the rod 30 in the direction of the arrow 38, the inherent resiliency which tends to project the hook member 22 laterally as shown at 40 in Figure 1, creates a sufficient co-efficient of friction at the point of engagement of the elements 26, 28 so that the end portion 28 of the rod 30 is prevented from sliding from the eye 26 and the hook member 22 is retained in its normal position adjacent the shank 14.

However, when a fish attacks the bait on the hook, the hook member 22 is depressed, so to speak, toward the shank 14 as indicated at 42 in Figure 1, which action is sufficient to eliminate the frictional resistance between the elements 26, 28 and to permit the rod portion 28 to be withdrawn as at 38 from the eye 26, by means of the compression spring 34. This withdrawal is illustrated in Figure 2, and as soon as it is effected, the inherent resiliency of the hook member 22 will automatically cause the hook member to project itself laterally as shown in Figure 2, thus firmly lodging itself in the mouth of the fish.

The invention also includes in its construction a tubular bait receptacle 44 which is preferably formed from transparent, flexible material so that the bait 46 therein may be exposed to view by the fish, this bait either assuming the form of a worm, a minnow or the like.

One end portion of the receptacle 44 is insertable in the aforementioned loop 18 of the shank portion 16, this end portion of the receptacle preferably being provided with a small aperture 48 so as to facilitate expulsion of air when the bait is inserted in the receptacle and also, to admit a supply of water to the bait, in instances where minnows are used.

The remaining end portion of the receptacle 44 is insertable between a pair of rings, namely, an outer ring 50 and an inner ring 52, these two rings being hingedly connected together by means of a suitable, hinge-like link 54 and the outer ring 50 being rigidly secured to the body 12 as at 56.

The outer diameter of the inner ring 52 is somewhat smaller than the inner diameter of the outer ring 50, so that when the end portion of the receptacle 44 is inserted in the outer ring 50, the inner ring 52 may be swung to a position where it is disposed substantially in the plane of the outer ring 50, thus firmly clamping the end portion of the receptacle between the two rings 50, 52, as will be clearly apparent.

It is believed that the advantages and use of the invention will be readily understood from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

In a fishing device, the combination of an elongated shank having a substantially straight end portion and a curved end portion, a block secured to the straight end portion of said shank for connecting the same to a fish hook, a single ring swingably mounted on the curved end portion of the shank, a second ring rigidly secured at the top thereof to said block, a hinge member at the bottom of said second ring, a third ring carried by said hinge member and swingable into the second ring to frictionally engage the same, and an elongated tubular bait receptacle of transparent material extending along said shank and having an open front end portion frictionally clamped between and closed by the second and third rings, said receptacle having a closed rear end portion extending through the first mentioned ring and provided with an aperture.

CHARLES T. SAMPSON.

REFERENCES CITED

The following references are of record in the file of this patent:

UNITED STATES PATENTS

| Number | Name | Date |
|---|---|---|
| 423,000 | Turnbull | Mar. 11, 1890 |
| 470,311 | Stretch | Mar. 8, 1892 |
| 745,221 | Miller | Nov. 24, 1903 |
| 856,867 | Hayward | June 11, 1907 |
| 862,150 | Fredericks | Aug. 6, 1907 |
| 973,119 | Lisch | Oct. 18, 1910 |
| 997,473 | Stimson | July 11, 1911 |
| 1,114,698 | Lane | Oct. 20, 1914 |
| 1,278,146 | Henthorn | Sept. 10, 1918 |
| 1,489,156 | Russell | Apr. 1, 1924 |
| 1,591,640 | Middleton | July 6, 1926 |
| 1,600,618 | Bentley | Sept. 21, 1926 |
| 1,915,189 | Koehl | June 20, 1933 |

FOREIGN PATENTS

| Number | Country | Date |
|---|---|---|
| 21,576 | Great Britain | 1912 |